US012131204B1

(12) United States Patent
Cahoon et al.

(10) Patent No.: US 12,131,204 B1
(45) Date of Patent: Oct. 29, 2024

(54) LATENCY MITIGATION FOR INTER-PROCESS COMMUNICATION

(71) Applicant: Zoox, Inc., Foster City, CA (US)

(72) Inventors: Ryan Martin Cahoon, Mountain View, CA (US); Ryder Rishel, Mountain View, CA (US); Shao-Han Tang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 112 days.

(21) Appl. No.: 17/900,160

(22) Filed: Aug. 31, 2022

(51) Int. Cl.
*G06F 9/54* (2006.01)
*G06F 9/445* (2018.01)

(52) U.S. Cl.
CPC .......... *G06F 9/546* (2013.01); *G06F 9/44505* (2013.01)

(58) Field of Classification Search
None
See application file for complete search history.

(56) References Cited

U.S. PATENT DOCUMENTS

| | | | | |
|---|---|---|---|---|
| 5,357,612 | A * | 10/1994 | Alaiwan | G06F 9/546 709/216 |
| 6,601,089 | B1 * | 7/2003 | Sistare | G06F 9/544 709/215 |
| 6,847,991 | B1 * | 1/2005 | Kurapati | H04L 49/9015 711/147 |
| 2001/0014918 | A1 * | 8/2001 | Harter, Jr. | G06F 9/546 719/313 |
| 2002/0144006 | A1 * | 10/2002 | Cranston | G06F 9/544 719/314 |
| 2007/0011687 | A1 * | 1/2007 | Ilik | G06F 9/546 719/313 |
| 2009/0037929 | A1 * | 2/2009 | Shimko | G06F 21/606 719/312 |
| 2012/0303670 | A1 * | 11/2012 | Gillen | G06F 9/5072 707/E17.012 |
| 2013/0054917 | A1 * | 2/2013 | Ludwig | G06F 9/468 711/163 |
| 2015/0261558 | A1 * | 9/2015 | Robinson | G06F 11/1458 718/1 |
| 2016/0306578 | A1 * | 10/2016 | Drzewiecki | G06F 12/1416 |
| 2020/0192872 | A1 | 6/2020 | Quinn | |
| 2020/0210255 | A1 * | 7/2020 | Shen | G06F 9/546 |
| 2022/0155975 | A1 * | 5/2022 | Nortman | G06F 3/0679 |
| 2022/0159070 | A1 * | 5/2022 | Nortman | H04L 67/06 |
| 2022/0300356 | A1 * | 9/2022 | Wu | G06F 9/544 |

* cited by examiner

*Primary Examiner* — Charles E Anya
(74) *Attorney, Agent, or Firm* — Lee & Hayes, P.C.

(57) ABSTRACT

This disclosure describes techniques for latency mitigation during inter-process communication based on pre-allocating and managing shared memory. During the startup phase (e.g., prior to run-time), processes of vehicle computing systems may request to engage in communication with other processes within the vehicle computing system. Based on the request, a memory manager may determine an amount of shared memory to pre-allocate. In such examples, the amount of shared memory may be determined based on a maximum number of messages that may be "in-flight" at any single instance during run-time, and a maximum size of a message. The memory manager may pre-allocate shared memory consistent with the determined amount, and transmit a key to the requesting process. In such examples, the key may enable the process to access the pre-allocated shared memory. After the startup phase has ended, the process may read and/or write messages to and from the shared memory.

20 Claims, 7 Drawing Sheets

//LATENCY MITIGATION FOR INTER-PROCESS COMMUNICATION

BACKGROUND

Robotic systems, such as autonomous vehicles, may include computing systems configured to receive, generate, analyze, and output various data to control the operations of the robotic systems. Such data may include sensor data collected from sensor devices of an autonomous vehicle, map data stored based on previous driving experiences, or other data. In the case of autonomous vehicles and other robotic systems, such data may be necessary for navigating safely and efficiently through an environment. For instance, autonomous vehicles may include safety critical computing systems that may utilize such data to detect and classify objects, in addition to predicting and planning safe paths by which the autonomous vehicle may proceed. In some examples, the size and/or complexity of the data may result in processing delays and errors in controlling the vehicle in the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
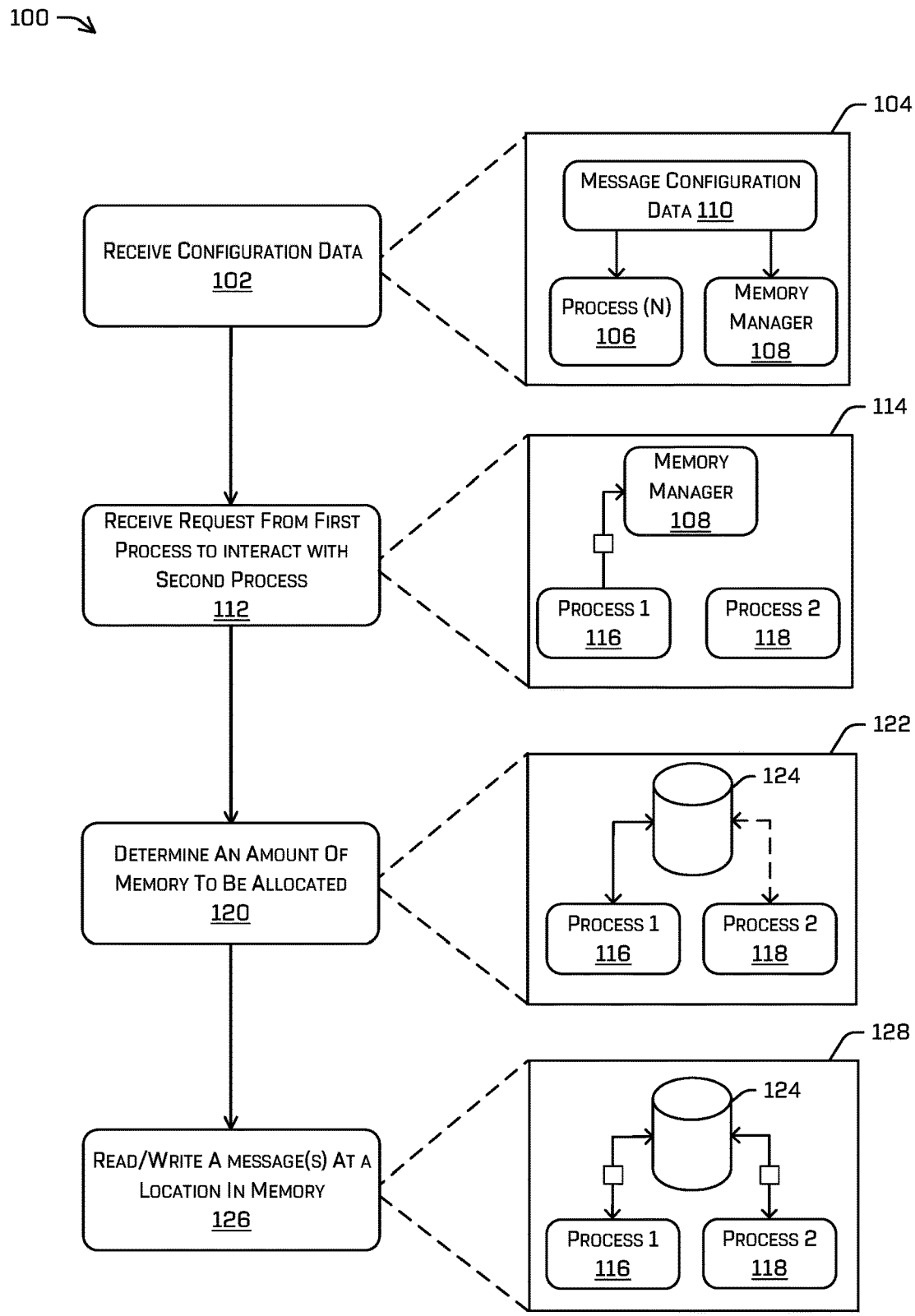
FIG. 1 is a pictorial flow diagram illustrating a technique of inter-process communications using a pre-allocated shared memory within a computing system, in accordance with one or more examples of the disclosure.

This disclosure describes techniques for latency mitigation during inter-process communication based on pre-allocating and managing a shared memory. As described herein, a memory manager of a computing system may pre-allocate a shared memory based on a maximum number of potential messages. Further, the computing systems may facilitate access to messages within the shared memory by maintaining message state information. In some examples, the techniques described herein may apply to vehicles controlled by vehicle computing systems and/or other robotics systems. A vehicle may engage in a startup phase prior to a run-time of the vehicle components and processes. During the startup phase, a message configuration component may transmit configuration data to the various components and processes of the vehicle computing systems. Such configuration data may provide instructions and/or information to the processes. In some examples, a process executing on the vehicle computing system(s) of a vehicle may request to engage in communication with one or more other processes on the vehicle computing system. Such a request may include portions of the configuration data which may be analyzed by the memory manager in determining an amount of shared memory to pre-allocate. In such examples, the amount of shared memory may be determined based on a predetermined maximum number of messages that are allowed to be "in-flight" at a single time during run-time of the vehicle computing systems, and a maximum message size. The memory manager may pre-allocate shared memory consistent with the determined amount and may transmit a key to the shared memory to the requesting process. The key may enable the process to access the pre-allocated shared memory.

After the startup phase has ended, the process may use the key to read and/or write messages from and to the shared memory to communicate with other processes on the vehicle computing systems. In some examples, additional processes may send separate requests to the memory manager to communicate with other processes on the vehicle computing system. In such examples, the memory manager may determine, based on the configuration data included in the request, that shared memory associated with the request has previously been allocated, and may transmit each additional process a separate key enabling the processes access to the shared memory. As discussed throughout this disclosure, these techniques may improve vehicle safety and driving efficiency by ensuring that safety critical messages are passed with limited latency, thereby enabling the vehicle to perform more efficient and accurate driving maneuvers and other vehicle actions.

As described above, while operating within a driving environment, an autonomous vehicle may receive large amounts of data. Such data may be obtained from a variety of sources, including sensor data captured by a number of sensors of the vehicle or received from remote sensors of the surrounding environment. The sensor data, which may include image data, radar data, lidar data, etc., may be analyzed by processes and/or components of the autonomous vehicle while operating within the driving environment. Further, the vehicle may also receive map data which may include a map of an environment, as well as driving instructions and/or vehicle control messages which may be received from an operator of the vehicle or from remote teleoperation systems providing additional instructions to the vehicle.

In some examples, the computing systems of the vehicle may instantiate and execute any number of processes and/or other software components configured to interact and coordinate with one another to perform various vehicle operations. During such operations, individual processes may receive, store, analyze, generate, and/or update the data, including receiving data from and transmitting data to other processes. A vehicle may include numerous (e.g., tens, hundreds, thousands, etc.) processes which may operate independently to perform actions that may require access to such data. Such processes may utilize the data in order to determine an accurate representation of the driving environment, and determine a safe path by which the vehicle may proceed. In some examples, such processes (e.g., including subprocesses and/or related software components) may include perception, prediction, and/or planning components, described in more detail herein. In combination, the perception, prediction, and/or planning components may perform various functions by analyzing data and passing analyzed data to and from other components for further processing within data processing pipelines.

When writing and/or reading messages (e.g., data) between processes within a computing system of the vehicle, latency within the process-to-process communication may result in processes receiving outdated or otherwise inaccurate data. In some examples, a process may attempt to transmit data to one or more other processes that may rely on such data to perform additional tasks (e.g., perception, prediction, planning, etc.). The data transmitted between various processes during inter-process communication also may vary in size. In such examples, the larger the size of data being passed, the increased degree of latency that may be introduced to the inter-process communication. For example, a first process may attempt to send a message to a second process, but the arrival of the message at the second process may be delayed due to the large size of the message being transmitted, or due to a message (e.g., large in size) sent prior to the current message. Additional causes of delay may be from processes allocating (e.g., during run-time) additional memory, and inefficient data management (e.g., copying data, serializing and deserializing data upon transfer, etc.). In some situations, safety critical systems of the vehicle may need a current representation of the driving environment (e.g., the most recent message/data). A process may send safety critical data, and due to the latency in communication, the receiving process may not receive the most current message in time to properly instruct the vehicle to modify the vehicle actions accordingly. Consequently, latency in communication may cause safety critical processes limited time (e.g., if any time) to determine safe vehicle actions.

To address the technical problems and inefficiencies caused by latency within the process-to-process communication (e.g., such as potentially determining vehicle actions based on outdated or inaccurate data), the techniques described herein include pre-allocating and utilizing shared memory based on a maximum (or possible) number of "in-flight" messages, and managing access to the shared memory by maintaining proper message states in order to overcome blocking writers due to resource exhaustion (e.g., message blocking). Initially, a vehicle (or other robot system) may engage in a startup phase. A startup phase may be a moment in which the vehicle turns on, initializes, and/or any other like situation. In some examples, the startup phase occurs before components and/or processes of the vehicle computing system begin run-time. Further, the startup phase may persist so long as components and processes of the vehicle have not agreed to begin runtime. In some examples, the startup phase may end when a threshold number of components and processes agree to begin runtime (e.g., processes have information (e.g., sensor data) needed to perform particular functions).

In some examples, during the startup phase and before run-time, a message configuration data component may transmit configuration data to a number of processes of the vehicle computing systems. The message configuration data component may be maintained by the computing system and include a comprehensive listing and/or database of information representing the current processes and/or potential processes that may be instantiated on the computing system of the vehicle. In some examples, the message configuration component may include process and/or message information regarding specific topics of inter-process communication. As described above and below, the message configuration component may transmit such configuration data to a number of processes and/or a memory manager component. The message configuration component may contain data gathered through heuristic analysis by a component and/or using knowledge about a specific configuration of the vehicle (e.g., specific component message size, message structure, message frequency, component bus size, component function, etc.). In other words, the message configuration component may have precomputed or predetermined data for determining communication requirements between components of a vehicle to mitigate latency using the disclosed techniques. The components may be sensor systems, various compute resources, redundant systems, battery controllers, vehicle actuator controllers, etc. that may be part of a vehicle and the message configuration component for a vehicle may have relevant information for component contained therein. Alternatively or additionally, the message configuration component may contain similar data related to processes of a vehicle.

In some examples, and during the startup phase, a number of processes may request to communicate and/or interact with one or more other processes within the vehicle computing system. The computing systems of the vehicle may include a memory manager component configured to pre-allocate memory, and assist processes of the computing system in gaining access to such memory. In some examples, a first process may send a request (e.g., including portions of the configuration data) to the memory manager component to interact with one or more other processes within the computing system. Further, the first process may request to interact with processes which may be interacting with data directed towards a particular topic (e.g., type and/or source of information). The first process may send the request based on the first process utilizing data originating from such processes and/or topics. For example, due to a process utilizing current sensor data, the process may request to interact with other processes that provide and/or analyze such sensor data.

Examples of topics used within a computing system can be found, for example, in U.S. Patent Publication No. 20200192872, filed Dec. 13, 2018, and titled "Device Message Framework," in contents of which is herein incorporated by reference in its entirety and for all purposes.

Based on the request from the first process, the memory manager may pre-allocate an amount of shared memory to be used for reading and writing messages between the processes executing on the computer system. In some examples, the memory manager may analyze the request based on the provided configuration data. In some examples, the message configuration component may transmit the same configuration data to the processes and memory manager. As such, upon receiving the request, the memory manager may analyze the configuration data sent within the request, with the configuration data that is stored within the memory manager. Based on determining that the configuration data provided within the request matches the configuration data stored by the memory manager, the memory manager may determine the amount of shared memory to be allocated, which may be used by the various processes during run-time to write messages to and/or read messages from other processes.

In some examples, the memory manager may determine a maximum number of messages that may be allowed "in-flight" at a single time during runtime of the vehicle computing system. Details regarding "in-flight" messages may be discussed in more detail below. Further, the memory manager may determine a maximum size of any message that may be written between such processes (e.g., message size may be topic dependent). In some examples, the memory manager may determine the total amount of shared memory to pre-allocate based on the maximum number of messages that may be allowed "in-flight" and the maximum size of any message.

In some examples, the memory manager may utilize the configuration data provided by the message configuration data component to determine the maximum number of messages that may be allowed "in-flight." In some examples, the memory manager may use a combination of factors (e.g., configuration data) in order to determine the maximum number of messages that may be "in-flight" at any instance in run-time. Such factors may include a maximum queue storage size, the maximum number of messages that each writing process may have in an allocated state, the maximum number of messages that each reading process may have in a read state, the maximum number of writing processes, the maximum number of reading processes, and/or any other like factor. In some examples, the memory manager may combine such factors in order to determine the maximum number of messages that may be "in-flight." In such examples, the memory manager may combine such a determination with the maximum message size in order to determine a total amount of shared memory to be pre-allocated. In other examples, the configuration data may include the total amount of shared memory to be allocated. In such examples, the memory manager may not be required to determine the total amount of shared memory to be allocated by using such factors.

In some examples, the memory manager may pre-allocate, and provide access to, shared memory consistent with the total amount determined above. Shared memory may be a segment of memory available to processes with permission. Such shared memory may be associated with a particular topic (e.g., perception data, prediction data, planning data, lidar sensor data, radar sensor data, etc.). The shared memory may include one or more queues and/or lists within which messages may be stored, a header (e.g., includes information about the queue and the shared memory), and/or other like features to support writing/reading a queue of messages. After pre-allocating the shared memory, the memory manager may send a key to the first process. In some examples, the key may enable the first process to access and/or attach to the shared memory. In some examples, the first process may read and/or write messages from/to the queue within the shared memory.

As processes read and/or write messages from and/or to other processes via the shared memory, the computing system of the vehicle may manage the access and availability of the messages to the other processes. In some examples, messages being read and/or written between processes may be in one of a number of different states. Such state information may be used to enable efficient use of the shared memory and/or messages, ensure that message data does not get modified and/or deleted improperly, as well as ensure proper recovery of shared memory is performed after one or more of the attached processes (e.g., reading or writing processes) fail (e.g., crash). Further, maintaining state information may obviate message blocking which may occur when processes are unable to access the most recent messages due to particular processes taking extensive time to read previous messages. In some examples, the computing systems may use a header within the shared memory to facilitate the management of messages and determine a state of a message. The header may include information about each process that has access to the shared memory. Further, the header may include state information for each message being passed between processes.

In some examples, the state of a message may change based on actions of the processes. States may include a free state, an allocated state, written state, and/or read state. However, this is not intended to be limiting, the header may include more or less states associated with the messages. In some examples, a message begins in a free state upon allocation of the message queue. The message state may transition to an allocated state when a process intends to write a message to the message queue. In such examples, the process may change the state from a free state to an allocated state. Messages in an allocated state may be hidden from one or more other processes. The message state may transition to a written state when the process writes (e.g., pushes) an index of the message into the message queue. In such examples, the message is visible to one or more other processes that have access to the shared memory. The message state may transition to a read state when a different process accesses and/or views the contents of the message within the queue. In such examples, the message state may remain in a read/accessed state while one or more other processes access and/or view the contents of the message. Further, messages in a read state may be prohibited from being re-used and subsequently overwritten. Upon determining that the message is no longer desired by other processes (e.g., below a threshold level of processes), the message state may transition from the read state to a free state so that the index within the queue may be re-used (e.g., a new message may be written).

In some examples, one or more other processes may read messages from the shared memory. As described above, the first process may write a message to the shared memory. One or more other processes may be listening to the shared memory in order to detect a change (e.g., update) within the message queue. In some examples, the header may include a sequence number that may be updated (e.g., incremented, changed, etc.) when a process writes a message to the message queue. The listening processes may observe the sequence number and compare the current sequence number to a sequence number obtained from a previous time. In such examples, if the difference of the current sequence number and the previous sequence number is non-zero then the listening processes may determine that a new message has been written to the message queue. Upon detecting that a new message has been written to the queue, the listening process can access the message and view the contents thereof. In such examples, the state of the message may transition from a written state to a read state.

In some examples, additional processes of the vehicle computing systems may request to engage in inter-process communication. Additional processes (e.g., subsequent to the first process) may send a request to the memory manager to interact with one or more other processes and/or topics. In some examples, the requests may include portions of configuration data received from the message configuration component described above. In such examples, after receiving a request from a process to engage in inter-process communication, the memory manager may analyze the request based on the configuration data within the request, and the memory manager's stored configuration data. Based on the configuration data within the request matching the configuration data stored by the memory manager, the memory manager may determine whether the shared memory has already been pre-allocated. If the shared memory has already been allocated, the memory manager may send a key to the requesting process, enabling the process to access the shared memory and engage in inter-process communication. In some examples, such processes may read and/or write from and to the shared memory in order to communicate with other processes.

In some examples, the computing system may recover shared memory after one or more of the attached reading and/or writing processes have failed (e.g., crashed). Attached processes may fail during any part of the inter-process communication cycle. For example, writing and reading processes may fail when performing various functions with the shared memory (e.g., reading messages, writing messages, releasing messages, etc.). Further, such processes may fail while not performing functions and/or interacting with the shared memory. In some examples, the computing system may detect and manage failing processes when new processes request to attach and/or interact with the shared memory. In such cases, the computing system may receive a request from a new process. The computing system may determine whether the maximum allowed processes using the queue within the shared memory has been reached (e.g., is full), and if the maximum allowed processes has not been reached, the computing system may permit the new process to attach to the shared memory (e.g., regardless if a process has failed). If the maximum allowed processes has been reached (e.g., queue is full), the computing system may determine whether any of the already attached processes are no longer running. In the case that a process is not running and the maximum allowed processes has been reached, the computing system may remove the non-running process, and release messages which the non-running process had in an allocated state or read state.

The techniques described herein can improve the functioning, safety, and efficiency of autonomous and semi-autonomous vehicles traversing through driving environments by pre-allocating a total amount of shared memory to more efficiently conduct inter-process communication. The computing systems described herein may improve vehicle safety and driving efficiency by ensuring that messages sent from safety critical systems are received by the intended processes with low latency, thereby ensuring that the most recent messages are viewed. Such computing systems achieve low latency communication based on pre-allocating a total amount of shared memory prior to runtime (e.g., obviating the need to re-allocate additional memory during runtime). The improved reduced latency in communication can allow processes (e.g., and the vehicle as a whole) adequate time to determine modified vehicle actions.

In further examples, by performing the processes described herein, the autonomous vehicle may reduce the amount of copying of messages and re-allocating of memory. By eliminating serialization, deserialization, copying, and allocation within the computing systems during runtime, such computing systems may decrease the load on system components and lessen the amount of memory required. Reducing latency can improve safety outcomes and/or comfort levels by controlling an autonomous vehicle, for example, to alter a trajectory or otherwise navigate the autonomous vehicle safely in an environment The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. In other examples, any or all of the techniques described herein may be implemented in other machine vision systems, such as security systems, object inspection and/or quality assurance systems, environment monitoring systems, etc.

FIG. 1 is a pictorial flow diagram illustrating an example process 100 of inter-process communications within a computing system using a pre-allocated shared memory. In various examples, some or all of the operations in process 100 may be performed by various computing system components within an autonomous vehicle.

Figure 2:
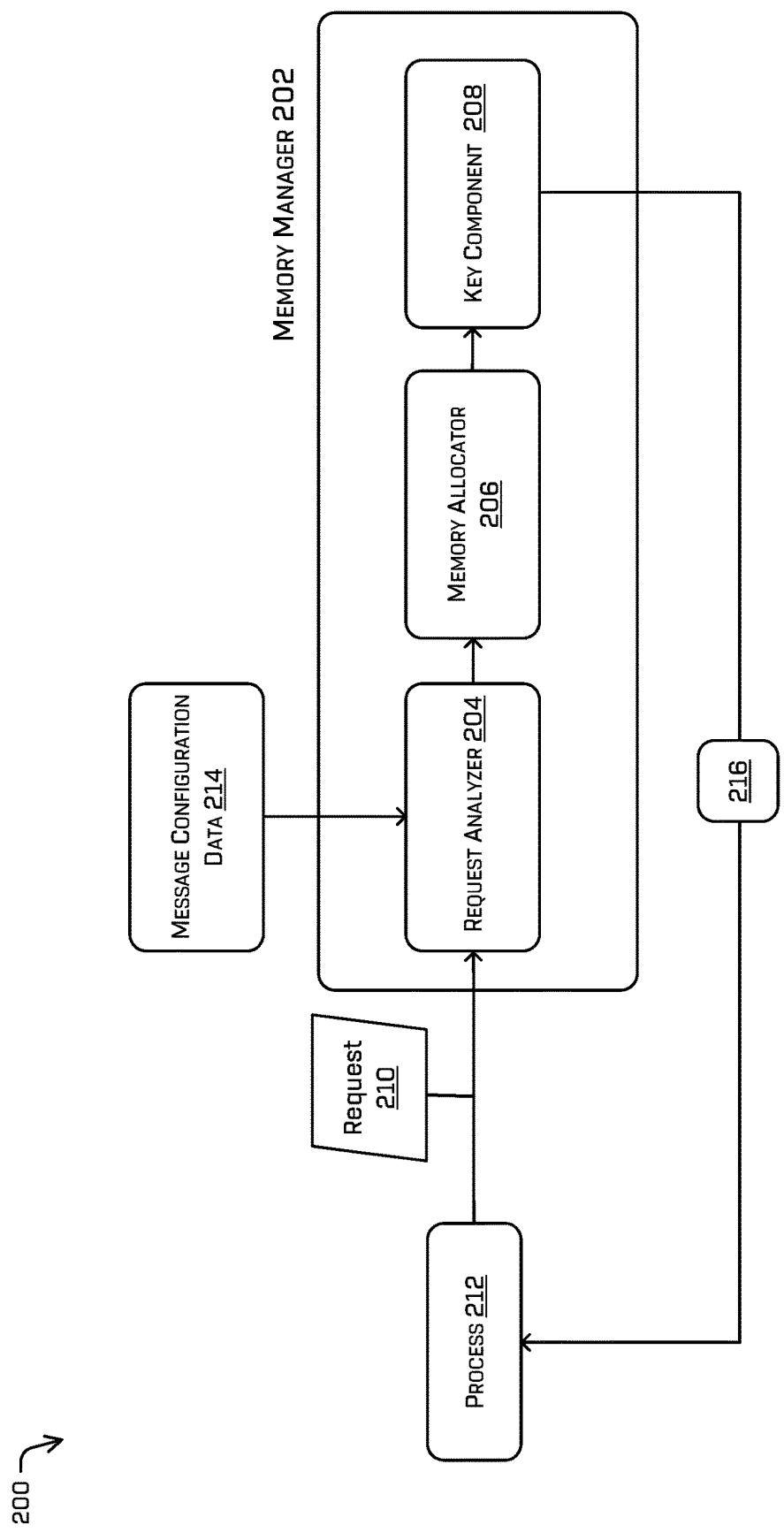
FIG. 2 illustrates an example computing system including a memory manager configured to pre-allocate a shared memory, in accordance with one or more examples of the disclosure.

At operation 102, one or more processes and a memory manager component of a computing system may receive configuration data from a message configuration data component. In some examples, computing systems may include a number of processes and/or components configured to perform various functions. Further, the processes and/or components of the computing systems may each include one or more subprocesses and/or subcomponents. In such examples, computing systems may include numerous (e.g., tens, hundreds, thousands, etc.) processes and/or components. In some examples, the computing systems may include a memory manager component configured to pre-allocate (e.g., during a startup phase and before run-time) shared memory and provide requesting processes access to such shared memory. Further, in some examples, the computing systems may include a message configuration data component designed to store and transmit configuration data to the processes and the memory manager. The message configuration data component may include a comprehensive listing and/or database of information representing the current processes and/or potential processes that may be instantiated on the computing system of the vehicle. Such configuration data may include process and/or message information. As shown in FIG. 1, box 104 illustrates a number of processes 106 and a memory manager 108 receiving configuration data from a message configuration data component 110. In this example, the message configuration data component 110 may provide the number of processes 106 and the memory manager 108 similar (e.g., or the same) configuration data. In some examples, the configuration data may include information about the way in which the number of processes 106 may engage in inter-process communication. The message configuration data component may be described in more detail below (FIG. 2).

At operation 112, the memory manager 108 may receive a request from a first process to interact with a second process. For example, box 114 illustrates a first process 116 and a second process 118 interacting with a memory manager 108. In this example, the first process 116 and the second process 118 may be similar processes as described above with respect to the number of processes 106. In this example, the first process 116 may send a request to the memory manager 108. The request may include at least a portion of the configuration data received from the message configuration data component 110. In some examples, the configuration data may include a topic about which the first process 116 wants to communicate. In some examples, a topic may include data from, and/or about, a specific source (e.g., lidar sensor data, radar sensor data, teleoperations data, etc.). Further, the configuration data may include various processes with which the first process 116 wants to interact. In such examples, the intended purposes of the first process 116 may rely on accessing and utilizing data from one or more other processes. This example is not intended to be limiting, computing systems may include additional or fewer processes.

In some examples, the memory manager 108 may receive the request from the first process 116. The memory manager 108 may be configured to pre-allocate shared memory and provide requesting processes access to the shared memory. Based on receiving the request from the first process 116, the memory manager 108 may analyze the configuration data within the request provided by the first process 116. In some examples, the memory manager 108 may verify and/or validate that the configuration data is similar to the configuration data that was provided to the memory manager 108 by the message configuration data component 110. Upon verifying and/or validating the configuration data, the memory manager 108 may determine whether the memory manager 108 has already pre-allocated shared memory associated with the requested process and/or topic. Based on determining that the first process 116 is the first process to make such a request, and that the shared memory has not yet been allocated, the memory manager 108 may determine an amount of shared memory to pre-allocate for storing messages communicated between processes engaging in inter-process communication.

At operation 120, the memory manager 108 may determine a total amount of shared memory to be allocated to support the inter-process communication on the computing system. In some examples, the memory manager 108 may determine a sufficient amount of shared memory to be pre-allocated obviating the need to re-allocate additional memory during run-time. In such examples, the memory manager 108 may determine a maximum number of messages that may be "in-flight" at a single time during run-time. The memory manager 108 may utilize the configuration data provided by the message configuration data component 110 to obtain such information. For example, the configuration data may include a topic, the maximum queue storage size, the maximum number of messages that each writing process may have in an allocated state, the maximum number of messages that each reading process may have in a read state, the maximum number of writing processes, the maximum number of reading processes, and/or any other like factor. In some examples, the memory manager 108 may receive information from the message configuration data component 110 in order to determine a total amount of shared memory to be pre-allocated.

In some examples, the memory manager 108 may use a number of factors (e.g., regarding the computing systems and/or processes) in order to determine a total amount of shared memory to pre-allocate. In order to determine a total amount of shared memory to pre-allocate, the memory manager 108 may determine a maximum number of allowed messages that may be "in-flight" at any instance between processes. In some examples, the maximum number of messages that may be "in-flight" may be determined based on a number of factors. Such factors may include a maximum storage size of a queue (e.g., maximum number of messages which can be in a written state), a maximum number of messages that each writing process may have in an allocated state, a maximum number of messages that each reading process may have in a read state, a maximum number of writing processes, a maximum number of reading processes, and/or any other like factor. In such examples, the memory manager 108 may use the factors in a variety of different methods in order to determine the maximum number of "in-flight" messages. Additional methods may be discussed in more detail below (FIG. 2).

In some examples, the memory manager 108 may determine the total amount of shared memory to be pre-allocated by multiplying the maximum number of "in-flight" messages with a maximum size of a message. The memory manager 108 may receive the maximum size (e.g., bytes) of a message to be shared between processes from the configuration data. In some examples, the maximum message size may differ based on the processes engaging in the communication, the topic about which the processes are communicating, and/or any other like factor.

In some examples, the memory manager 108 may pre-allocate shared memory consistent with the determined total amount. In some examples, upon allocating the shared memory, the memory manager 108 may also provide a key (e.g., handle) to the requesting process. The key may enable the requesting process to access the shared memory. In such examples, the key may attach the process to the shared memory. For example, box 122 illustrates a pre-allocated shared memory segment ("shared memory 124"). In this example, the memory manager 108 may send the first process 116 a key to attach to the shared memory 124. In such examples, the first process 116 may use the key to access the shared memory 124. As shown in box 122, the first process 116 and the second process 118 may access the shared memory 124.

In some examples, one or more additional (e.g., and subsequent) processes may send a request to interact with the shared memory 124. As shown in box 122, the second process 118 has a dashed line between it and the shared memory 124. Such a dashed line may illustrate that the second process 118 may also access the shared memory 124. In some examples, the second process 118 may send a request to the memory manager 108 to interact with the shared memory 124, a particular topic, one or more other processes, or the like. In such examples, the memory manager 108 may determine that the second process 118 provided a request subsequent to the request of the first process 116 (e.g., shared memory may already be pre-allocated). Based on the request of the second process 118 being after the request of the first process 116, the memory manager 108 may send a key to the second process 118. Similar to the key provided to the first process 116, the key provided to the second process 118 may enable the second process 118 to access the shared memory 124.

Figure 4A:
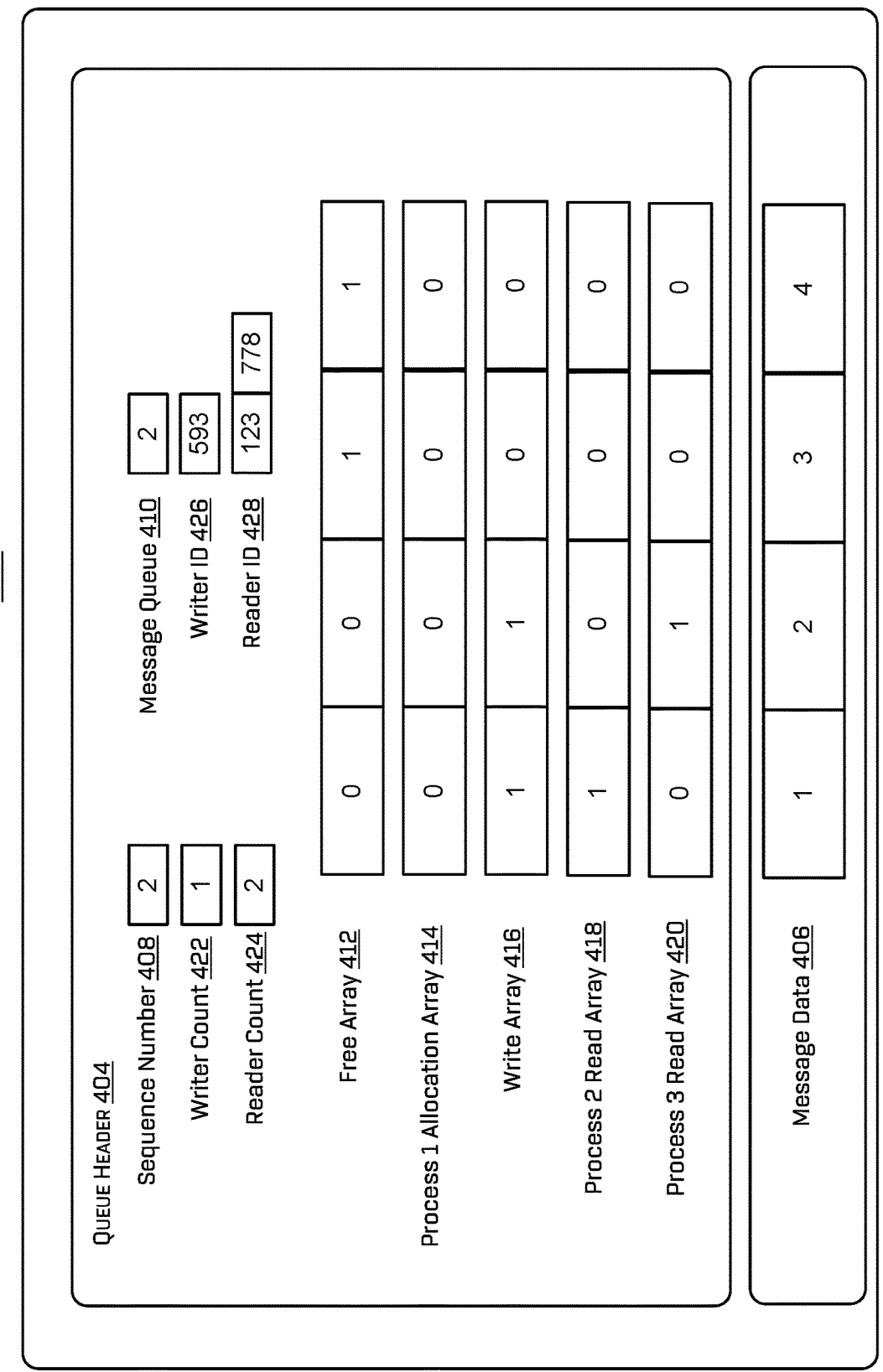
FIG. 4A depicts an example shared memory configured to organize and facilitate access of messages, in accordance with one or more examples of this disclosure.
Figure 4B:
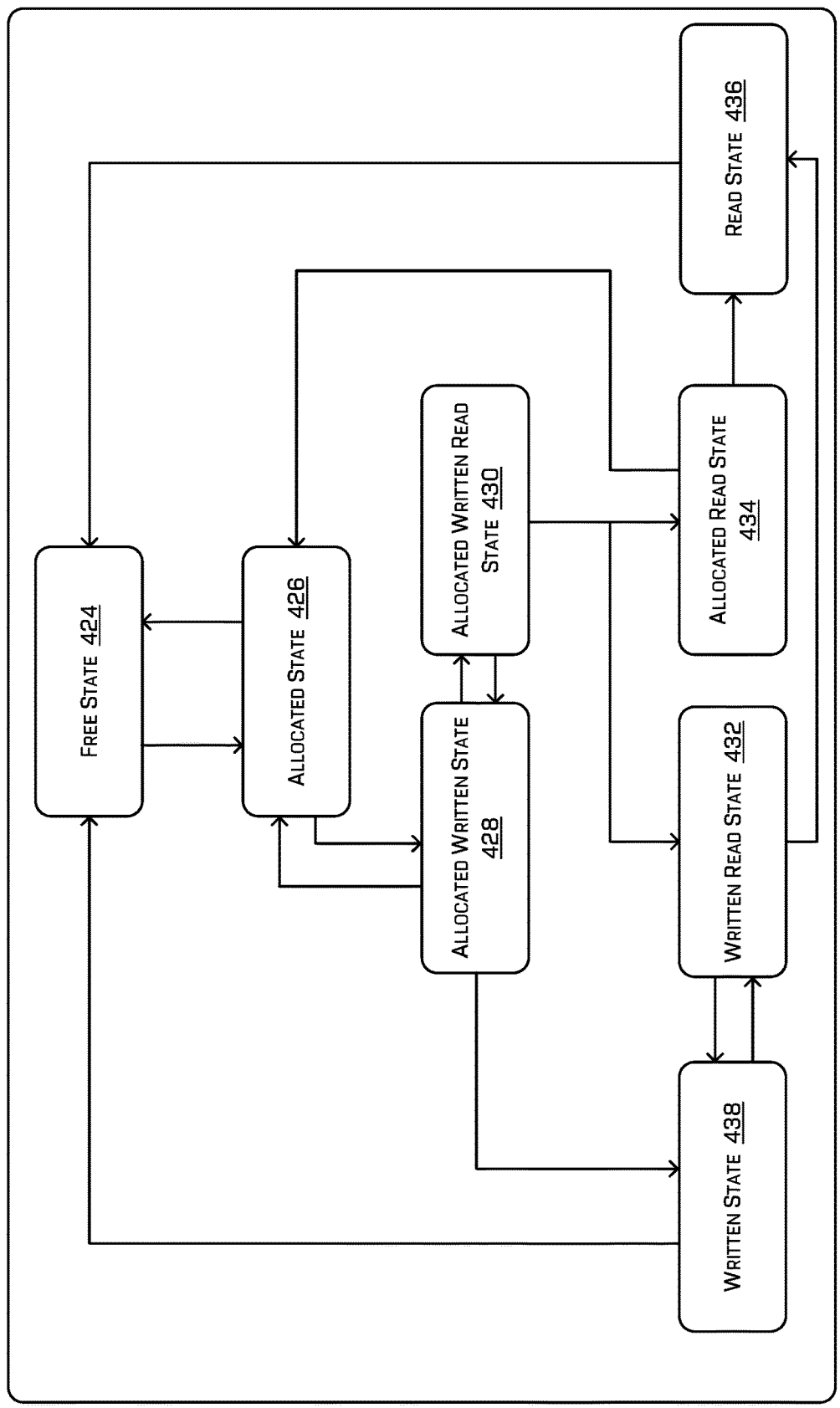
FIG. 4B depicts an example state machine illustrating message state transitions, in accordance with one or more examples of the disclosure.

At operation 126, the first process 116 and/or the second process 118 may read and/or write a message at a location in the shared memory 124. In some examples, the shared memory 124 may include one or more queues and/or indicators configured to manage access to, and availability of, messages being passed between processes. In such examples, the shared memory 124 may include state information for each message. Such state information may impact the method in which processes may access, read, and/or write messages to the shared memory 124. Additional details about message state information may be discussed in more detail below (FIGS. 4A and 4B).

For example, box 128 illustrates the first process 116 and the second process 118 reading and writing messages to and from the shared memory 124. In some examples, the first process 116 and the second process 118 may both read and write messages to the shared memory 124. In other examples, individual processes (e.g., the first process 116 or the second process 118) may be permitted to solely write messages to the shared memory 124, or may be permitted to solely read messages from the shared memory 124. In some examples, when the first process 116 writes a message to the shared memory 124, the message will be available to all processes which have access to the shared memory 124 (e.g., the second process). Processes may access and or retrieve messages (e.g., message data) from the shared memory 124 independent of the other processes. Processes may use the state information and/or pointers to access and identify available and newly passed messages.

FIG. 2 illustrates an example computing system 200 including an example memory manager 202 configured to pre-allocate shared memory for inter-process communication. In some examples, the memory manager 202 may be similar or identical to the memory manager 108 described above, or in any other examples herein. As noted above, in some cases the memory manager 202 may be implemented within or otherwise associated with a number of computing systems of an autonomous vehicle. In some examples, the memory manager 202 may include various components, described below, configured to perform different functionalities of a latency-reducing communication technique. In some examples, the memory manager 202 may include a request analyzer component 204 configured to receive requests from a process within the computing system, in addition to determining whether the requesting process is a first, or subsequent, process to send a request to the memory manager 202. Additionally, the memory manager 202 may include a memory allocator component 206 configured to determine a total amount of shared memory to allocate, and pre-allocating such shared memory. Further, the memory manager 202 may include a key component 208 configured to provide keys to the requesting processes.

In some examples, the memory manager 202 may receive a request 210 from a process 212. In some examples, the process 212 may be similar or identical to the first process 116 and/or the second process 118 described above, or in any other examples herein. The process 212 may be any process of the computing system of an autonomous vehicle. In some examples, the process 212 may include subprocesses configured to perform one or more separate functions. In some examples, the request 210 may be similar or identical to the request described above, or in any other examples herein. As described above, a message configuration data component may send the process 212 configuration data which may be included in the request 210. The configuration data may include a topic about which the process 212 wants to communicate, one or more processes with which the process 212 wants to interact, and/or any other like information.

In some examples, a request analyzer 204 may receive the request 210 from the process 212, and configuration data from a message configuration data component 214. In some examples, the message configuration data component 214 may be similar or identical to the message configuration data component 110 described above, or in any other examples herein. During the startup phase, the message configuration data component 214 may send the same configuration data to the request analyzer 204 and the process 212. The memory manager 202 may store the configuration data, and use such data upon receiving requests from the processes within the computing system. The process 212 may include at least a portion of the configuration data in the request 210, indicating to the memory manager 202 about which the process 212 wants to engage in inter-process communication. The configuration data may include information about how the computing system, in particular the processes, may engage in inter-process communication. In some examples, the configuration data may include one or more topics with which the process 212 wants to engage in inter-process communication. Specifically, the configuration data may include one or more topics, a maximum queue storage size each of the topics, the maximum number of messages that each writing process may have in an allocated state, the maximum number of messages that each reading process may have in a read state, the maximum number of writing processes, the maximum number of reading processes, and/or any other like factor.

In some examples, the request analyzer 204 may be configured to receive a request, and determine whether the requesting process is a first, or subsequent, process to send a request to the memory manager 202. The request analyzer 204 may verify and/or validate that the configuration data within the request is the same as the configuration data which was sent to the memory manager 202 by the message configuration data component 214. For example, the request 210 may include configuration data indicating that the process 212 wants to engage in inter-process communication with a first lidar sensor (e.g., topic), the queue size for such the first lidar sensor is four, the maximum number of permitted writers is one, the maximum permitted readers is 10, etc. In such an example, the request analyzer may compare each factor provided in the request to verify and/or validate that the factors within the request are the same factors stored by the memory manager 202. If the configuration data differs (e.g., the configuration data provided to the memory manager 202 from the message configuration data component 214 indicates that the queue size for the first lidar sensor is five, not four), the request analyzer 204 may instruct the memory manager to deny the request 210. If the configuration data is the same as what the memory manager 202 has stored, then the request analyzer 204 may determine whether the memory manager 202 has already pre-allocated shared memory consistent with the request. In some examples, the request analyzer 204 may determine whether shared memory for the topic in the request 210 (e.g., the first lidar sensor) has previously been pre-allocated. In other examples, the request analyzer 204 may use other factors provided in the configuration data to determine whether shared memory has been pre-allocated. Based on such determinations, the request analyzer 204 may send instructions to a memory allocator component 206.

In some examples, the memory manager 202 may include a memory allocator component 206 configured to pre-allocate shared memory to be used by one or more processes during inter-process communication. The memory allocator component 206 may determine a total amount of memory to be pre-allocated. In some examples, the memory allocator component 206 may use the configuration data provided within the request 210 and/or the configuration data provided to the memory manager 202 from the message configuration data component 214 in order to determine the total amount of memory to pre-allocate. In such examples, the memory allocator component 206 may retrieve information from the configuration data about a topic, a maximum storage size of a queue (e.g., the size of the queue may vary depending on the purpose and/or topic of the communication), the maximum number of messages that each writing process may have in an allocated state, the maximum number of messages that each reading process may have in a read state, the maximum number of writing processes, the maximum number of reading processes. Further, the configuration data may include the total amount of shared memory to be allocated. In other examples, the memory allocator component 206 may make a first determination by determining the maximum number of allowed "in-flight" messages based on combining (e.g., multiplying) the maximum number of messages that each writing process may have in an allocated state with the maximum number of writing processes. Further, the memory allocator component 206 may make a second determination by combining (e.g., adding) the maximum size of the queue with the maximum number of messages that each reading process may have in a read state. Further, the memory allocator component 206 may make a third determination by multiplying the second determination with the maximum number of reading processes, plus one. By combining the first and third determinations, the memory allocator component 206 may determine the maximum number of allowed messages. Based on determining the maximum number of allowed messages, the memory allocator 206 may multiply this value with the maximum size of a message read and/or written between the processes. The memory allocator component 206 may pre-allocate shared memory consistent with the total amount of shared memory previously determined.

In some examples, the memory manager 202 may include a key component 208. The key component 208 may be configured to provide a key 216 to the process 212. In some examples, the key component 208 may include one or more keys associated with a number of different shared memory segments and/or different topics. In such examples, for each topic, and the topic's associated shared memory segment, the key component 208 may have a corresponding key that may be sent to requesting processes. Based on the pre-allocation of the shared memory, the key component 208 may send a key 216 corresponding to the shared memory to the process 212. In some examples, the key 216 may enable the process 212 to access the shared memory and engage in inter-process communication. In some examples, if the process 212 is a subsequent requesting process (e.g., the shared memory has already been pre-allocated), then the key component 208 may identify and/or locate the key that corresponds to the topic indicated within the request 210. Upon identifying and/or locating the key 216, the key component 208 may send the key 216 to the process 212.

Figure 3:
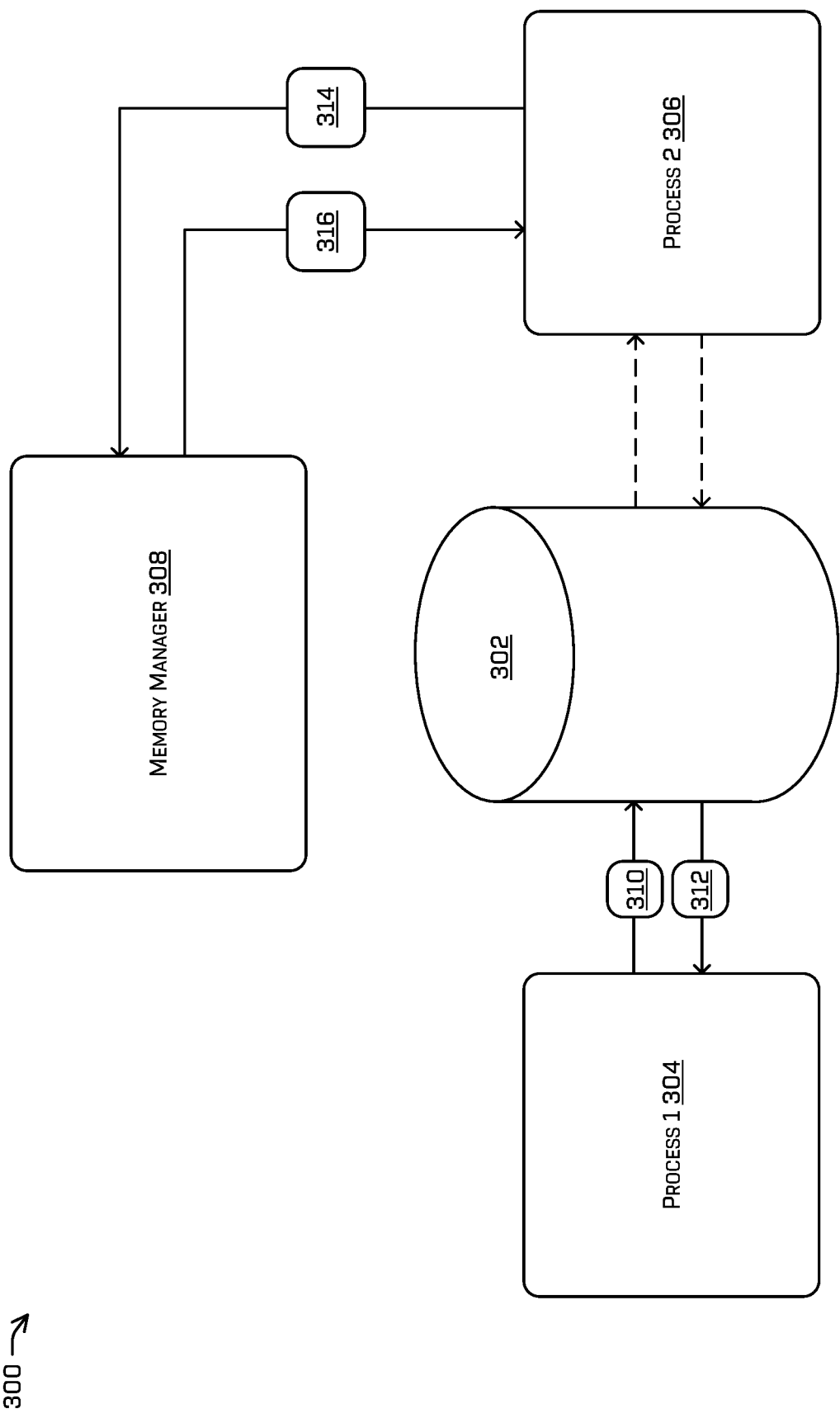
FIG. 3 depicts an example computing system illustrating processes interacting with a shared memory, in accordance with one or more examples of this disclosure.

FIG. 3 depicts an example computing system 300 including processes interacting with shared memory 302.

In some examples, the computing system 300 may be similar or identical to the computing system of FIG. 1. As described above, the example computing system 300 may include a number of processes interacting with shared memory 302. In some examples, the example computing system 300 may include a first process 304 and a second process 306. Further, the example computing system 300 may include a memory manager 308. In some examples, the first process 304 may have access to the shared memory 302. In such examples, the first process 304 may write a message 310 to the shared memory 302. When writing the message 310 to the shared memory 302, the first process 304 may write the message 310 to a location within a queue (e.g., within the shared memory 302). Further, the first process 304 may read a message 312 from the shared memory 302. In some examples, the first process 304 may retrieve a pointer (e.g., index, offset, address, etc.) from a within the shared memory, and use the pointer to identify the location of the message 312 within a queue of the shared memory 302.

In some examples, the computing system 300 may also include the second process 306 sending a request 314 to the memory manager 308 (e.g., similar or identical to the memory manager described above and below). The memory manager 308 may receive the request 314 from the second process 306. As described above, the memory manager 308 may verify and/or validate that the configuration data provided within the request is the same as the configuration data provided by a message configuration data component. Further, based on receiving the request 314 from the second process 306, the memory manager 308 may determine that the request 314 of the second process 306 was sent after a request sent by the first process 304. Further, the memory manager 308 may determine that the memory manager 308 pre-allocated the shared memory 302 at a previous time. As such, memory manager 308 may identify and/or locate a key that corresponds to the topic within the request 316. Based on identifying such a key, the memory manager 308 may send the key 316 to the second process 306. In some examples, the key 316 may enable the second process 306 to access the shared memory 302. Further, based on receiving access to the shared memory 302 (e.g., based on the key 316), the second process may read and/or write messages from and to the shared memory 302.

FIG. 4A depicts an example shared memory 402 configured to organize and facilitate the access of messages. In some examples, the shared memory 402 and the various components found within may obviate message blocking and enable the most recent message to be accessible and/or viewable to a reader process. Further, the shared memory 402 and the various components found within may also ensure proper recovery of shared memory is performed after one or more of the attached processes (e.g., reading or writing processes) fail (e.g., crash).

The example shared memory 402 may include a queue header component 404 and a message pool component 406. The queue header component 404 may include process and/or message information (e.g., state information). The message data component 406 may include message data being shared between two or more processes.

In some examples, the queue header component 404 may include a number of different components. As shown in FIG. 4, the queue header component 404 may include a sequence number 408 and a message queue array 410. Further, the queue header component 404 may include various lists (e.g., arrays) configured to help identify a state of a message. In such examples, the queue header component 404 may include a free array 412, a first process allocation array 414, a write array 416, a second process read array 418, and a third, or more, process read arrays 420. However, this example is not intended to be limiting, the queue header component 404 may have more or fewer arrays based on the number of processes which have access to the shared memory 402. Further, each process may read and/or write messages to and from the shared memory 402. In other examples, some processes may solely read messages from the shared memory 402, while other processes solely write messages to the shared memory 402.

In some examples, the queue header component 404 may be updated as processes read and/or write to and from the shared memory 402. The free array 412 may indicate a presence (e.g., or lack thereof) of a message at a location within the message pool 406. In some examples, the free array 412 may include a "1" if the message with the same array index within the message data component 406 is empty and available for writing. A "0" in the free array 412 may indicate that a message may be in-use at that location within the message data component 406. In some examples, the first process allocation array 414 may indicate that a process has reserved a message at a location within the message data component 406 for exclusive use. When a message is placed within the message data component 406, the state of the message may transition from a free state to an allocated state. In such examples, when a message is in an allocated state, the message may not yet be visible (e.g., hidden) to other processes which may have access to the shared memory 402.

In some examples, the writing process may make the message accessible (e.g., visible) to other processes. A process may update a message at a particular index within the message data component 406, transitioning the message from a free state to an allocated state. In such examples, the writing process may obtain the index representative of the location within the message data component 406 which contains the message. A process may make the message visible to other processes by writing the index of the location of the message within the message data component 406 to the message queue 410. Writing the index to the message queue 410 may transition the message from an allocated state to a written state (e.g., putting a "1" in the write array 418). Further, upon writing the index to the message queue 410, the computing systems may update (e.g., increment) the sequence number.

In some examples, processes that have access to the shared memory 402 may access and/or retrieve messages that are in a written state (e.g., indicated by the write array 418). In some examples, processes may wait for the shared memory 402 to be updated to determine if a new message has been written to the message data component 406. As shown in FIG. 4, the queue header 404 may include a sequence number 408. In some examples, when a process writes an index to the message queue 410 (e.g., writes a message), the sequence number 408 may be incremented to indicate that a new message is available. In such examples, a process may detect a change (e.g., update) within the shared memory 402 based on comparing the sequence number 408 with a sequence number that the process stored from a previous time (e.g., last time the process checked the sequence number 408, stored in a cache local to the process). If the difference between the sequence number 408 and the previous sequence number is non-zero then the listening process may determine that a new message has been written to the message data component 406. In such examples, the listening process may access the message queue 410 to retrieve the index in which the message is stored within the message data component 406. In such examples, the listening process may access the message data component 406 to view the contents of the message by using the index obtained from the message queue 410.

In some examples, the processes may access and/or view messages within the message data component 406. The queue header 404 may include a second process read array 420 and a third, or more, process read arrays 422. In some examples, a message may transition to one of the read arrays (e.g., while staying in the write array 416) based on a process accessing and/or retrieving the message. A message in a read state may be protected from being overwritten by one or more other processes. In some examples, when a threshold number of processes (e.g., which have access to the shared memory 402) no longer need the message, the message may transition from a read state to a free state (e.g., available for new messages to overwrite).

In some examples, the shared memory 402 may also include a writer count component 422, a reader count component 424, a writer identifier component 426, and a reader identifier component 428. In some examples, the writer count component 422 may indicate the maximum number of writing processes which may be permitted to interact with the shared memory 402. The reader count component 424 may indicate the maximum number of reading processes which may be permitted to interact with the shared memory 402. The writer identifier component 426 may include a process identifier for each process which has attached to the shared memory 402 and is a writing process. Further, the reader identifier component 426 may include a process identifier for each process which has attached to the shared memory 402 and is a reading process.

In some examples, the computing system may utilize the writer count component 422, the reader count component 424, the writer identifier component 426, and the reader identifier component 428 in determining if any of the already attached processes have failed, and in such situations, recover shared memory. For example, the computing system may determine whether a process has failed when a new process requests to attach and/or interact with the shared memory 402. In such cases, a new process may request to attach and interact with the shared memory 402. The computing system may determine whether the maximum allowed processes has been reached (e.g., queue is full) by evaluating the number of writing and reading processes that have attached to the shared memory by using the writer count component 422 and the reader count component 424. If the computing system determines that maximum allowed processes has not been met, the computing system may permit the new process to attach to the shared memory 402 (e.g., regardless if a process has failed). Based on the techniques used to determine the total amount of shared memory to pre-allocate, the shared memory 402 may have sufficient space for all processes (e.g., within the configuration data) to attach and interact with the shared memory 402. If the computing system determines that the maximum allowed processes has been reached, the computing system may determine whether any of the already attached processes have failed by comparing the recorded process identifiers (e.g., writer identifier component 426 and the reader identifier component 428) with the currently running process identifier. In the case that a process is found on either the writer identifier component 426 or the reader identifier component 428 and is determined to not be running, and the maximum allowed processes has been reached, the computing system may remove the non-running process, and release messages which the non-running process had in an allocated state or read state.

FIG. 4B depicts an example state machine illustrating message state transitions, in accordance with one or more examples of the disclosure.

The example message state machine 422 may include various message states. In some examples, the states described in FIG. 4B may be a same or similar state as described above and below. The message state machine 422 may include a free state 424. The free state 424 may be indicative of an available location for a process to write a message. A message and/or index of the message data component 406 may transition from a free state 424 to an allocated state 426 when a process writes message data to the message data component 406. When in the allocated state 426, the message is in a hidden, or protected state. In some examples, processes reading from the shared memory 402 may be unable to see the message data when in an allocated state 426.

In some examples, a message may transition from an allocated state 426 to an allocated written state 428 when the writing process writes the index in which the message data is stored within the message data component 406 to the message queue 410. When in the allocated written state 428, the message may be visible and accessible to reading processes. In some examples, the message may transition from the allocated written state 428 to the allocated written read state 430 when a listening process accesses and/or views the contents of the message data. When in the allocated written read state 430, messages may be protected from being overwritten with new messages. A message may transition from the allocated written read state 430 to a written read state 432 or an allocated read state 434.

In some examples, the message may transition to a read state 436 when the message is no longer in the write array 416. As described above, messages in the read state 436 may be protected from being overwritten from other messages. Further, messages may transition to a written state when reading processes have determined the message is no longer needed. Upon such a determination, the message may transition back to a free state 422, a state in which a new message may be written to the shared memory at the previous message's index within the message data component 406.

As shown in FIG. 4B, the provided description is not intended to be limiting, messages may transition from state to state in a number of different combinations.

Figure 5:
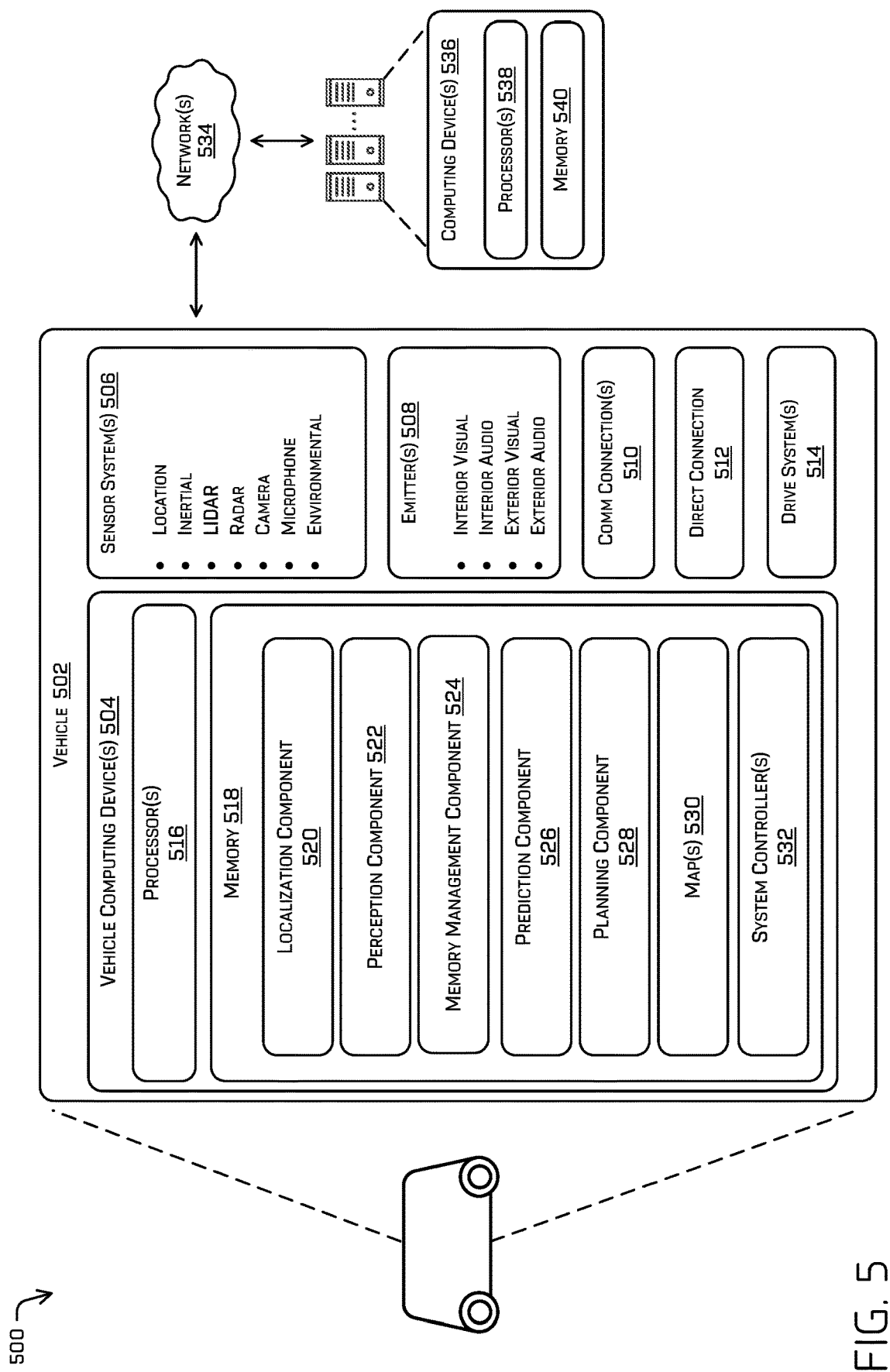
FIG. 5 depicts a block diagram of an example system for implementing various techniques described herein.

FIG. 5 is a block diagram of an example system 500 for implementing the techniques described herein. In at least one example, the system 500 may include a vehicle, such as vehicle 502.

The vehicle 502 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 502 is an autonomous vehicle; however, the vehicle 502 could be any other type of vehicle, such as a semi-autonomous vehicle, or any other system having at least an image capture device (e.g., a camera enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In the illustrated example, the memory 518 of the vehicle computing device 504 stores a localization component 520, a perception component 522, a prediction component 526, a memory management component 524, a planner component 528, one or more system controllers 532, and one or more maps (represented by map data 530). Though depicted in FIG. 5 as residing in the memory 518 for illustrative purposes, it is contemplated that the localization component 520, the perception component 522, the prediction component 526, the memory management component 524, the planner component 528, system controller(s) 532, and/or the map(s) may additionally, or alternatively, be accessible to the vehicle 502 (e.g., stored on, or otherwise accessible by, memory remote from the vehicle 502, such as, for example, on memory 540 of one or more remote computing device 536).

In at least one example, the localization component 520 may include functionality to receive sensor data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 502 within the environment. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 502. In some instances, the localization component 520 may provide data to various components of the vehicle 502 to determine an initial position of the vehicle 502 for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 502. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 502. In some examples, the prediction component 526 may measure a trace of an object and generate a trajectory for the object based on observed and predicted behavior.

The memory management component 524 may be configured to facilitate low latency communication between processes of the vehicle computing device(s) 504. For example, the memory management component 524 may be configured to receive requests from one or more processes within the vehicle computing device 504 to interact with one or more processes. Additionally, the memory component management 524 may pre-allocate, during a startup phase and before run-time, shared memory which may be accessed by approved processes. Upon receiving access to the shared memory, processes may engage in inter-process communication by reading and/or writing to and from the shared memory. In some examples, the memory management component 524 may pre-allocate enough shared memory so that no additional allocations of memory are needed during runtime.

In general, the planner component 528 may determine a path for the vehicle 502 to follow to traverse through an environment. For example, the planner component 528 may determine various routes and trajectories and various levels of detail. For example, the planner component 528 may determine a route to travel from a first location (e.g., a current location) to a second location (e.g., a target location). For the purpose of this discussion, a route may include a sequence of waypoints for traveling between two locations. As non-limiting examples, waypoints include streets, intersections, global positioning system (GPS) coordinates, etc. Further, the planner component 528 may generate an instruction for guiding the vehicle 502 along at least a portion of the route from the first location to the second location. In at least one example, the planner component 528 may determine how to guide the vehicle 502 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 528 may select a trajectory for the vehicle 502.

In other examples, the planner component 528 may alternatively, or additionally, use data from the localization component 520, the perception component 522, and/or the prediction component 526 to determine a path for the vehicle 502 to follow to traverse through an environment. For example, the planner component 528 may receive data (e.g., object data) from the localization component 520, the perception component 522, and/or the prediction component 526 regarding objects associated with an environment. In some examples, the planner component 528 receives data for relevant objects within the environment. Using this data, the planner component 528 may determine a route to travel from a first location (e.g., a current location) to a second location (e.g., a target location) to avoid objects in an environment. In at least some examples, such a planner component 528 may determine there is no such collision free path and, in turn, provide a path which brings vehicle 502 to a safe stop avoiding all collisions and/or otherwise mitigating damage.

In at least one example, the vehicle computing device 504 may include one or more system controllers 532, which may be configured to control steering, propulsion, braking, safety, emitters, communication, and other systems of the vehicle 502. The system controller(s) 532 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 526, and/or the planner component 528 to determine a location of the vehicle 502, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some instances, aspects of some or all of the components discussed herein may include any models, techniques, and/or machine learned techniques. For example, in some instances, the components in the memory 518 (and the memory 540, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 534, to the one or more computing device(s) 536 at a particular frequency, after a lapse of a predetermined period of time, in near real-time, etc.

The vehicle 502 may also include one or more emitters 508 for emitting light and/or sound. The emitter(s) 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seat belt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., remote computing device 536, other nearby vehicles, etc.) and/or one or more remote sensor system(s) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the prediction component 526, the memory component 524, the planner component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the prediction component 526, the memory management component 524, the planner component 528, the one or more system controllers 532, and the one or more maps 530 may send their respective outputs to the remote computing device(s) 536 at a particular frequency, after a lapse of a predetermined period of time, in near real-time, etc.

In some examples, the vehicle 502 may send sensor data to the computing device(s) 536 via the network(s) 534. In some examples, the vehicle 502 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may include a memory manager similar or identical to the memory management component 524). In some examples, the memory 540 may store one or more of components that are similar to the component(s) stored in the memory 518 of the vehicle 502. In such examples, the computing device(s) 536 may be configured to perform one or more of the processes described herein with respect to the vehicle 502.

The processor(s) 516 of the vehicle 502 and the processor(s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 6:
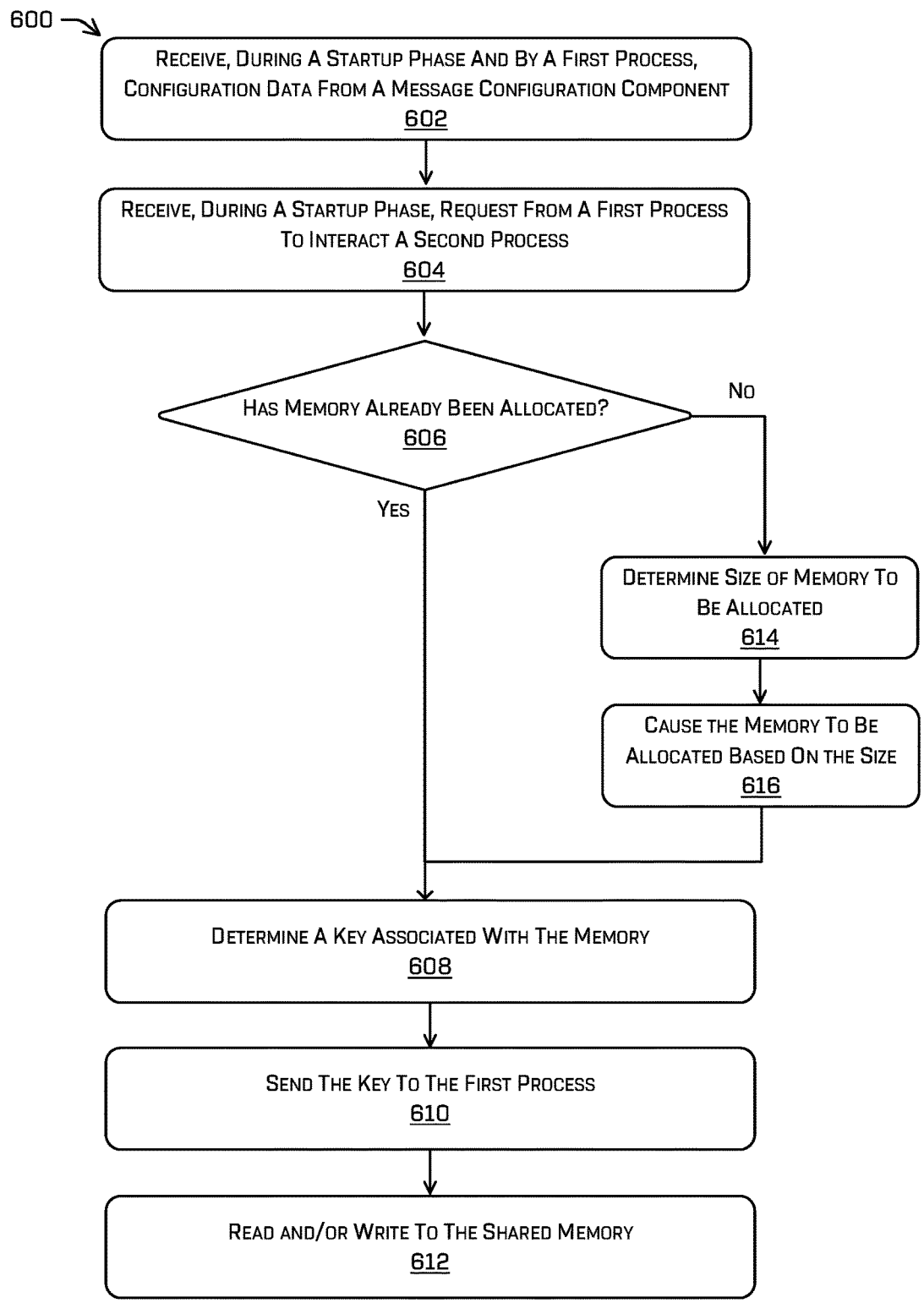
FIG. 6 is a flow diagram illustrating an example process of performing inter-process communications using a pre-allocated shared memory, in accordance with certain examples of the disclosure.

FIG. 6 is a flow diagram illustrating an example process 600 of receiving a request from a process, determining a total amount of shared memory to allocate, causing the total amount of shared memory to be allocated, and reading/writing to and from the shared memory. As described below, the example process 600 may be performed by one or more computer-based components configured to implement various functionalities described herein. For instance, some or all of the operations of process 600 may be performed by a computing system and/or a memory manager 202 configured to receive process requests, determine an amount of memory to allocate, pre-allocate such memory, and allow one or more processes to read and/or write to the memory.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the example process 600 can include receiving, during a startup phase and by a first process, configuration data from a message configuration data component. In some examples, the computing system of the autonomous vehicle may include numerous processes (e.g., and subprocesses) configured to perform various functions. Further, the computing system may also include a memory manager component configured to pre-allocate a total amount of shared memory, in addition to providing access to the shared memory. In some examples, a message configuration data component may transmit configuration data to the first process and the memory manger. The configuration data may include information about the way in which the processes may engage in inter-process communication. Specifically, the configuration data may include a topic, the maximum queue storage size, the maximum number of messages that each writing process may have in an allocated state, the maximum number of messages that each reading process may have in a read state, the maximum number of writing processes, the maximum number of reading processes, and/or any other like factor.

At operation 604, the example process 600 can include receiving, during a startup phase and before run-time, a request from a first process to interact with a second process. In performing such functions, the numerous processes may make use of data produced by one or more other processes. As such, processes may request to engage in inter-process communication in order to exchange messages (e.g., data). In some examples, a memory manager component of the computing system may receive the request from the first process. In some examples, the request may include at least a portion of the configuration data. The memory manager component use the configuration data to pre-allocate memory for the processes, and provide the requesting processes access to such memory.

At operation 606, the example process 600 can include determining whether memory associated with the request has already been pre-allocated. In some examples, the memory manager component may pre-allocate memory in response to a first request of a process. In such examples, the memory manager may use the configuration data (e.g., the topic) in order to determine whether shared memory associated the configuration data has already been pre-allocated. In such examples, if shared memory associated with the request has already been pre-allocated (e.g., the request is a subsequent request), the memory manager may provide a key to the shared memory that was allocated in response to the first request. If the memory manager component has pre-allocated memory associated with the request (606: Yes), then the memory manager component may determine a key associated with the shared memory. For example, at operation 608, the memory manager component may determine a key associated with the shared memory. The memory manager component may have a number of different keys that may be associated with a number of different shared memory segments and/or topics. Based on the request sent by the first process, the memory manager component may determine a key associated with the requested memory. In some examples, the key may enable a process access to the memory.

At operation 610, the example process 600 can include sending the key to the first process. In some examples, the memory manager component may send the key to the first process. In such examples, the first process may receive the key from the memory manager component and use the key to access and/or attach to the shared memory.

At operation 612, the example process 600 can include reading and/or writing to and from the memory. Based on having access to the memory, the first process may read and/or write to the memory. In some examples, the passing of messages may be facilitated and organized based on the memory maintaining state information for each of the messages. In such examples, message state information may inform and instruct processes in what manner each process may interact with particular messages within the shared memory.

In contrast, if the memory manager component has not pre-allocated memory associated with the request (606: No), the memory manager component may determine an amount of memory to be allocated. In such examples, at operation 614, the memory manager component may determine a maximum number of potential "in-flight" messages, in addition to a maximum message size. Based on such information, the memory manager component may determine a total amount of memory to pre-allocate. Further, the total amount of memory may be enough so that additional memory won't be allocated during run-time. At operation 616, the example process 600 can include causing the memory to be allocated based on the determined amount.

After pre-allocating the memory, the example process 600 can include the above mentioned operations. Specifically, at operation 608 the example process 600 can include determining a key associated with the memory. After determining the key, and at operation 610, the example process 600 can include sending the key to the first process, enabling the first process to access the shared memory. At operation 612, the example process 600 may include the first process reading and/or writing to and from the shared memory to engage in inter-process communication, as described above.

Example Clauses

A. The computing system of an autonomous vehicle, the computing system comprising: one or more processors; and one or more computer-readable media storing computer-executable instructions that, when executed, cause the one or more processors to perform operations comprising: receiving, by a memory manager and from a first process executing on the computing system and as part of a startup phase of the computing system, a request to interact with a second process executing on the computing system; receiving, by the memory manger and from a message configuration component, configuration data associated with the first process and the second process; determining, based at least in part on the request and the configuration data, a maximum allowed number of messages to be transmitted between the first process and the second process; determining, by the memory manager and based at least in part on the request and the maximum allowed number of messages and as part of the startup phase, a size of a shared memory to be allocated; allocating, by the memory manager and based at least in part on the size and at a first time, the shared memory including a queue; transmitting, by a memory manager and to the first process, a key associated with the shared memory; accessing, by the first process and using the key, the shared memory; writing, by the first process and at a second time after the first time, a message at a location in the queue of the shared memory; updating, by the first process, a sequence number associated with the queue; determining, by the second process and based at least in part on the sequence number, that an update has occurred within the queue; and accessing, by the second process and based at least in part on determining that the update has occurred within the queue, the message at the location.

B. The computing system of clause A, wherein the size is a first size, wherein determining the size of the shared memory to be allocated comprises determining at least one of: a maximum permitted message size between the first process and the second process; a first number of messages in an allocated state permitted for the first process; a second number of messages in a read state permitted for the second process; a number of processes on the computer system configured to transmit messages via the shared memory; or a number of processes on the computer system configured to receive messages via the shared memory.

C. The computing system of clauses A or B, wherein determining the size of the shared memory to be allocated comprises: determining a maximum permitted message size associated with the maximum allowed number of messages; and determining, based at least in part on the maximum allowed number of messages and the maximum message size, the size of the shared memory to be allocated.

D. The computing system of any of clauses A-C, wherein determining that the update has occurred within the queue comprises: receiving, by the second process, the sequence number from the shared memory, wherein the sequence number is associated with the queue; and comparing, by the second process, the sequence number to a previous sequence number received from the shared memory at a previous time.

E. The computing system of any of clauses A-D, wherein the message is a first message, the operations further comprising: receiving, by the memory manager and from the second process, a second request to interact with the first process; transmitting, by the memory manager and to the second process, a key associated with the shared memory; writing, by the second process, a second message at a second location within the queue; and updating, by the second process, the sequence number associated with the queue.

F. One or more non-transitory computer-readable media storing instructions executable by a processor, wherein the instructions, when executed, cause the processor to perform operations comprising: receiving, by a memory manager and from a first process executing on a computing system of a robot and as part of a startup phase of the computing system, a request to interact with a second process executing on the computing system; determining, based at least in part on the request, a maximum allowed number of messages to be transmitted between the first process and the second process; determining, by the memory manager and based at least in part on the request and the maximum allowed number of messages and as part of the startup phase, a size of a shared memory to be allocated; allocating, by the memory manager and based at least in part on the size and at a first time, the shared memory including a queue; writing, by the first process and at a second time after the first time, a message at a location within the queue of the shared memory; determining, by the second process, a sequence number associated with the queue; determining, by the second process and based at least in part on the sequence number and a previous sequence number, that an update has occurred within the queue; and accessing, by the second process and based at least in part on determining that an update has occurred within the queue, the message at the location.

G. The one or more non-transitory computer-readable media of clause F, wherein determining the size of the shared memory to be allocated comprises determining at least one of: a maximum permitted message size between the first process and the second process; a first number of messages in an allocated state permitted for the first process; a second number of messages in a read state permitted for the second process; a number of processes on the computer system configured to transmit messages via the shared memory; or a number of processes on the computer system configured to receive messages via the shared memory.

H. The one or more non-transitory computer-readable media of clauses F or G, wherein determining the size of the shared memory to be allocated comprises: determining a maximum permitted message size associated with the maximum allowed number of messages; and determining, based at least in part on the maximum allowed number of messages and the maximum message size, the size of the shared memory to be allocated.

I. The one or more non-transitory computer-readable media of any of clauses F-H, wherein determining that an update has occurred within the queue comprises: receiving, by the second process, the sequence number from the shared memory, wherein the sequence number is associated with the queue; and comparing, by the second process, the sequence number to a previous sequence number received from the shared memory at a previous time.

J. The one or more non-transitory computer-readable media of any of clauses F-I, wherein the message is a first message, the operations further comprising: receiving, by the memory manager and from the second process, a second request to interact with the first process; transmitting, by the memory manager and to the second process, a key associated with the shared memory; writing, by the second process, a second message at a second location within the queue; and updating, by the second process, the sequence number associated with the queue.

K. The one or more non-transitory computer-readable media of any of clauses F-J, wherein writing the message comprises: updating a message state associated with the message and stored at a message state location in the shared memory, to a value representing a hidden message state.

L. The one or more non-transitory computer-readable media of any of clauses F-K, wherein the request comprises first configuration data received from a message configuration component, the message configuration component comprising: a second configuration data for a third process, wherein the second configuration data is different that the first configuration data.

M. The one or more non-transitory computer-readable media of any of clauses F-L, wherein the request comprises configuration data received from a message configuration component, and wherein the configuration data is determined based at least in part on communication characteristics associated with the first process and the second process.

N. A method comprising: receiving, by a memory manager and from a first process executing on a computing system of a robot and as part of a startup phase of the computing system, a request to interact with a second process executing on the computing system; determining, based at least in part on the request, a maximum allowed number of messages to be transmitted between the first process and the second process; determining, by the memory manager and based at least in part on the request and the maximum allowed number of messages and as part of the startup phase, a size of a shared memory to be allocated; allocating, by the memory manager and based at least in part on the size and at a first time, the shared memory including a queue; writing, by the first process and at a second time after the first time, a message at a location within the queue of the shared memory; determining, by the second process, a sequence number associated with the queue; determining, by the second process and based at least in part on the sequence number and a previous sequence number, that an update has occurred within the queue; and accessing, by the second process and based at least in part on determining that an update has occurred within the queue, the message at the location.

O. The method of clause N, wherein determining the size of the shared memory to be allocated comprises determining at least one of: a maximum permitted message size between the first process and the second process; a first number of messages in an allocated state permitted for the first process; a second number of messages in a read state permitted for the second process; a number of processes on the computer system configured to transmit messages via the shared memory; or a number of processes on the computer system configured to receive messages via the shared memory.

P. The method of clauses N or O, wherein determining the size of the shared memory to be allocated comprises: determining a maximum permitted message size associated with the maximum allowed number of messages; and determining, based at least in part on the maximum allowed number of messages and the maximum message size, the size of the shared memory to be allocated.

Q. The method of clauses N-P, wherein determining that the first value exceeds the threshold comprises: determining a first radar cross section value associated with a first side lobe of the radar data; determining, based at least in part on the first virtual array, a second radar cross section value associated with an expected side lobe of the radar data; and determining that a difference between the first radar cross section value and the second radar cross section value exceeds the threshold.

R. The method of clauses N-Q, wherein the message is a first message, the operations further comprising: receiving, by the memory manager and from the second process, a second request to interact with the first process; transmitting, by the memory manager and to the second process, a key associated with the shared memory; writing, by the second process, a second message at a second location within the queue; and updating, by the second process, the sequence number associated with the queue.

S. The method of clauses N-R, wherein the request comprises first configuration data received from a message configuration component, the message configuration component comprising: a second configuration data for a third process, wherein the second configuration data is different that the first configuration data.

T. The method of clauses N-S, wherein the request comprises configuration data received from a message configuration component, and wherein the configuration data is determined based at least in part on communication characteristics associated with the first process and the second process.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A computing system of an autonomous vehicle, the computing system comprising:
   one or more processors; and
   one or more computer-readable media storing computer-executable instructions that, when executed, cause the one or more processors to perform operations comprising:
   receiving, by a memory manager and from a first process executing on the computing system and as part of a startup phase of the computing system, a request to interact with a second process executing on the computing system;
   receiving, by the memory manger and from a message configuration component, configuration data associated with the first process and the second process, wherein the configuration data includes a communication topic associated with the first process, wherein the communication topic indicates a source component of the autonomous vehicle;
   determining, based at least in part on the request and the configuration data, a maximum allowed number of messages to be transmitted between the first process and the second process;
   determining, by the memory manager and based at least in part on the request and the maximum allowed number of messages and as part of the startup phase, a size of a shared memory to be allocated;
   allocating, by the memory manager and based at least in part on the size and at a first time, the shared memory including a queue;
   transmitting, by a memory manager and to the first process, a key associated with the shared memory;
   accessing, by the first process and using the key, the shared memory;
   writing, by the first process and at a second time after the first time, a message at a location in the queue of the shared memory; updating, by the first process, a sequence number associated with the queue;
   determining, by the second process and based at least in part on the sequence number, that an update has occurred within the queue; and
   accessing, by the second process and based at least in part on determining that the update has occurred within the queue, the message at the location.

2. The computing system of claim 1, wherein the size is a first size, wherein determining the size of the shared memory to be allocated comprises determining at least one of:
   a maximum permitted message size between the first process and the second process;
   a first number of messages in an allocated state permitted for the first process;
   a second number of messages in a read state permitted for the second process;
   a number of processes on the computer system configured to transmit messages via the shared memory; or
   a number of processes on the computer system configured to receive messages via the shared memory.

3. The computing system of claim 1, wherein determining the size of the shared memory to be allocated comprises:
   determining a maximum permitted message size associated with the maximum allowed number of messages; and
   determining, based at least in part on the maximum allowed number of messages and the maximum message size, the size of the shared memory to be allocated.

4. The computing system of claim 1, wherein determining that the update has occurred within the queue comprises:
   receiving, by the second process, the sequence number from the shared memory, wherein the sequence number is associated with the queue; and
   comparing, by the second process, the sequence number to a previous sequence number received from the shared memory at a previous time.

5. The computing system of claim 1, wherein the message is a first message, the operations further comprising:
   receiving, by the memory manager and from the second process, a second request to interact with the first process;
   transmitting, by the memory manager and to the second process, a key associated with the shared memory;
   writing, by the second process, a second message at a second location within the queue; and
   updating, by the second process, the sequence number associated with the queue.

6. The computing system of claim 1, wherein the configuration data is first configuration data, wherein determining the size of the shared memory to be allocated is based at least in part on:
   receiving, by the first process, second configuration data that is separate from the first configuration data received by the memory manager; and
   determining, based at least in part on comparing the first configuration data with the second configuration data, a size of the shared memory to allocate.

7. One or more non-transitory computer-readable media storing instructions executable by a processor, wherein the instructions, when executed, cause the processor to perform operations comprising:
   receiving, by a memory manager and from a first process executing on a computing system of the autonomous vehicle and as part of a startup phase of the computing system, a request to interact with a second process executing on the computing system;

receiving, by the memory manager, configuration data associated with the first process and the second process determining, based at least in part on the request and the configuration data, a maximum allowed number of messages to be transmitted between the first process and the second process, wherein the configuration data includes a communication topic associated with the first process, wherein the communication topic indicates a source component of the autonomous vehicle;

determining, by the memory manager and based at least in part on the request and the maximum allowed number of messages and as part of the startup phase, a size of a shared memory to be allocated;

allocating, by the memory manager and based at least in part on the size and at a first time, the shared memory including a queue;

writing, by the first process and at a second time after the first time, a message at a location within the queue of the shared memory;

determining, by the second process, a sequence number associated with the queue;

determining, by the second process and based at least in part on the sequence number and a previous sequence number, that an update has occurred within the queue; and accessing, by the second process and based at least in part on determining that an update has occurred within the queue, the message at the location.

8. The one or more non-transitory computer-readable media of claim 7, wherein determining the size of the shared memory to be allocated comprises determining at least one of:
   a maximum permitted message size between the first process and the second process;
   a first number of messages in an allocated state permitted for the first process;
   a second number of messages in a read state permitted for the second process;
   a number of processes on the computer system configured to transmit messages via the shared memory; or
   a number of processes on the computer system configured to receive messages via the shared memory.

9. The one or more non-transitory computer-readable media of claim 7, wherein determining the size of the shared memory to be allocated comprises:
   determining a maximum permitted message size associated with the maximum allowed number of messages; and
   determining, based at least in part on the maximum allowed number of messages and the maximum message size, the size of the shared memory to be allocated.

10. The one or more non-transitory computer-readable media of claim 7, wherein determining that an update has occurred within the queue comprises:
    receiving, by the second process, the sequence number from the shared memory, wherein the sequence number is associated with the queue; and
    comparing, by the second process, the sequence number to a previous sequence number received from the shared memory at a previous time.

11. The one or more non-transitory computer-readable media of claim 7, wherein the message is a first message, the operations further comprising:

receiving, by the memory manager and from the second process, a second request to interact with the first process;

transmitting, by the memory manager and to the second process, a key associated with the shared memory;

writing, by the second process, a second message at a second location within the queue; and updating, by the second process, the sequence number associated with the queue.

12. The one or more non-transitory computer-readable media of claim 7, wherein writing the message comprises:
    updating a message state associated with the message and stored at a message state location in the shared memory, to a value representing a hidden message state.

13. The one or more non-transitory computer-readable media of claim 7, wherein the request comprises first configuration data received from a message configuration component, the message configuration component comprising:
    a second configuration data for a third process, wherein the second configuration data is different that the first configuration data.

14. The one or more non-transitory computer-readable media of claim 7, wherein the request comprises configuration data received from a message configuration component, and wherein the configuration data is determined based at least in part on communication characteristics associated with the first process and the second process.

15. A method comprising:
    receiving, by a memory manager and from a first process executing on a computing system the autonomous vehicle and as part of a startup phase of the computing system, a request to interact with a second process executing on the computing system;
    receiving, by the memory manager, configuration data associated with the first process and the second process, wherein the configuration data includes a communication topic associated with the first process, wherein the communication topic indicates a source component of the autonomous vehicle;
    determining, based at least in part on the request and the configuration data, a maximum allowed number of messages to be transmitted between the first process and the second process;
    determining, by the memory manager and based at least in part on the request and the maximum allowed number of messages and as part of the startup phase, a size of a shared memory to be allocated;
    allocating, by the memory manager and based at least in part on the size and at a first time, the shared memory including a queue;
    writing, by the first process and at a second time after the first time, a message at a location within the queue of the shared memory;
    determining, by the second process, a sequence number associated with the queue;
    determining, by the second process and based at least in part on the sequence number and a previous sequence number, that an update has occurred within the queue; and
    accessing, by the second process and based at least in part on determining that an update has occurred within the queue, the message at the location.

16. The method of claim 15, wherein determining the size of the shared memory to be allocated comprises determining at least one of:
    a maximum permitted message size between the first process and the second process;

a first number of messages in an allocated state permitted for the first process;

a second number of messages in a read state permitted for the second process;

a number of processes on the computer system configured to transmit messages via the shared memory; or a number of processes on the computer system configured to receive messages via the shared memory.

17. The method of claim 15, wherein determining the size of the shared memory to be allocated comprises:

determining a maximum permitted message size associated with the maximum allowed number of messages; and determining, based at least in part on the maximum allowed number of messages and the maximum message size, the size of the shared memory to be allocated.

18. The method of claim 15, wherein the message is a first message, further comprising:

receiving, by the memory manager and from the second process, a second request to interact with the first process;

transmitting, by the memory manager and to the second process, a key associated with the shared memory;

writing, by the second process, a second message at a second location within the queue; and updating, by the second process, the sequence number associated with the queue.

19. The method of claim 15, wherein the request comprises first configuration data received from a message configuration component, the message configuration component comprising:

a second configuration data for a third process, wherein the second configuration data is different that the first configuration data.

20. The method of claim 15, wherein the request comprises configuration data received from a message configuration component, and wherein the configuration data is determined based at least in part on communication characteristics associated with the first process and the second process.

* * * * *